(12) United States Patent
Müller et al.

(10) Patent No.: US 7,249,597 B2
(45) Date of Patent: Jul. 31, 2007

(54) INTERNAL EXHAUST RECIRCULATION METHOD FOR AN INTERNAL COMBUSTION ENGINE

(75) Inventors: Jochen Müller, Sankt Augustin (DE); Bernd Kircher, Niederzier (DE); Markus Duesmann, Stuttgart (DE); Enno Lohse, Stolberg (DE)

(73) Assignee: FEV Motorentechnik, GmbH, Aachen (DE)

( * ) Notice: Subject to any disclaimer, the term of this patent is extended or adjusted under 35 U.S.C. 154(b) by 0 days.

(21) Appl. No.: 10/550,849

(22) PCT Filed: Apr. 14, 2004

(86) PCT No.: PCT/EP2004/003903

§ 371 (c)(1), (2), (4) Date: Nov. 2, 2005

(87) PCT Pub. No.: WO2004/092561

PCT Pub. Date: Oct. 28, 2004

(65) Prior Publication Data

US 2006/0102157 A1 May 18, 2006

(30) Foreign Application Priority Data

Apr. 17, 2003 (DE) ................................ 103 17 685

(51) Int. Cl.
*F02B 25/07* (2006.01)
*F02B 25/00* (2006.01)

(52) U.S. Cl. ................................. 123/568.14

(58) Field of Classification Search ............ 123/568.14, 123/568.11, 568.13, 90.15, 90.16, 90.17, 123/90.18, 90.26, 90.27, 90.31
See application file for complete search history.

(56) References Cited

U.S. PATENT DOCUMENTS

| 4,722,315 | A | 2/1988 | Pickel |
| 6,761,147 | B2 * | 7/2004 | Majima ...................... 123/399 |
| 6,772,742 | B2 * | 8/2004 | Lei et al. ................ 123/568.14 |
| 6,827,067 | B1 * | 12/2004 | Yang et al. ............. 123/568.14 |
| 6,925,976 | B2 * | 8/2005 | Israel et al. .............. 123/90.12 |
| 7,028,652 | B2 * | 4/2006 | Iwashita et al. .......... 123/90.15 |

FOREIGN PATENT DOCUMENTS

| DE | 1222735 | 8/1966 |
| DE | 005783 | 11/2002 |

* cited by examiner

*Primary Examiner*—Mahmoud Gimie
(74) *Attorney, Agent, or Firm*—Townsend and Townsend and Crew LLP (57) ABSTRACT

The invention relates to the internal exhaust-gas recirculation in an internal combustion engine with gas exchange valves periodically controlled by a camshaft (22) in accordance with the four-stroke principle, in which, during the gas exchange exhausting of exhaust gas from the respective cylinder (1) into the exhaust duct (5), an intake valve (2) associated with the respective cylinder (1) is open in a crank angle range after top dead center of the ignition of the gas mixture present in the cylinder (1), in order to exhaust part of the exhaust gas into an intake duct (3), so that during the next gas exchange intake both fresh gas and exhaust gas are taken in from the intake duct (3), the respective intake valve (2) being actuated during the gas exchange exhausting independently of the periodic gas exchange intake, and the additional opening of the respective intake valve (2) being carried out in the range from 110 to 150% of the opening angle of the start of opening of the exhaust duct (5) by the exhaust valve (4).

20 Claims, 6 Drawing Sheets

INTERNAL EXHAUST RECIRCULATION METHOD FOR AN INTERNAL COMBUSTION ENGINE

BACKGROUND OF THE INVENTION

The invention relates to a method for internal exhaust-gas recirculation and to a correspondingly designed internal combustion engine.

Throughout the world, the demands imposed on the purity of the exhaust gases from internal combustion engines are subject to increasing statutory control, which is becoming ever more stringent. One possible way of satisfying these demands with regard to $NO_x$ emissions consists in internal exhaust-gas recirculation. This involves a certain quantity of exhaust gas being admixed with the fresh gas in a cylinder of the internal combustion engine prior to ignition. The $NO_x$ emission can be considerably reduced if an optimum mixing ratio is used.

To produce the mixture, DE 34 01 362 C2 has disclosed a method for internal exhaust-gas recirculation in an internal combustion engine with gas exchange valves periodically controlled by a camshaft in accordance with the four-stroke principle, in which the quantity of exhaust gas which remains in addition to the fresh gas after the gas exchange in the cylinder has ended can be adjusted by means of the opening and closing times of the gas exchange valves. If, for example, an exhaust is not closed after exhausting of exhaust gas from the cylinder has concluded, but rather is kept open for an adjustable period of time during the subsequent intake stroke, a quantity of exhaust gas, which depends on this period of time, can be taken in together with fresh gas. Consequently, the opening and closing times of the gas exchange valves simultaneously control the gas exchange and the internal exhaust-gas recirculation. Their implementation therefore constitutes a compromise between optimum gas exchange and optimum internal exhaust-gas recirculation.

WO 03/040540 has disclosed a method for internal exhaust-gas recirculation in which an intake valve is open during the gas exchange exhausting of exhaust gas from the cylinder into the exhaust duct, in order for part of the exhaust gas to be exhausted into the intake duct, so that both fresh gas and exhaust gas are taken in from the intake duct during the next gas exchange intake. In this case, the intake valve is actuated during the gas exchange exhausting independently of the periodic gas exchange intake, with the start of the primary stroke of the intake valve lying in the range between 180° and 210° and the end of this primary stroke lying in the range from approximately 270° to 310° crank angle after top dead center of the ignition. However, this only allows moderate exhaust-gas recirculation rates at full load.

SUMMARY OF THE INVENTION

Consequently, the invention is based on the object of providing internal exhaust-gas recirculation in which very high exhaust-gas recirculation rates are possible at full load and low or even zero exhaust-gas recirculation rates are possible at low engine speeds.

Consequently, the invention provides internal exhaust-gas recirculation in an internal combustion engine with gas exchange valves periodically controlled by a camshaft in accordance with the four-stroke principle, in which, during the gas exchange exhausting of exhaust gas from the respective cylinder into the exhaust duct, an intake valve associated with the respective cylinder is open in a crank angle range after top dead center of the ignition of the gas mixture present in the cylinder, in order to exhaust part of the exhaust gas into an intake duct, so that during the next gas exchange intake both fresh gas and exhaust gas are taken in from the intake duct, the respective intake valve being actuated during the gas exchange exhausting independently of the periodic gas exchange intake, and the additional opening of the respective intake valve being carried out in the range from 110 to 150% of the opening angle of the start of opening of the exhaust duct by the exhaust valve.

Contrary to expectations of the person skilled in the art, it has emerged that it is possible and at the same time expedient if exhaust gas can be passed into the intake duct in the above mentioned range, which is well before 180° crank angle (CA) after top dead center of the ignition (180° CA is the bottom dead center following top dead center of the ignition), i.e. at most at approximately 160° CA, and preferably at approximately 110 to 150° CA after top dead center of the ignition, and if this exhaust gas can be kept in the intake duct even at high engine speeds. On the other hand, at low engine speeds, on account of the considerably greater relief through expansion, pressure conditions result in which the exhaust gas which has been transported into the intake duct immediately flows back again, is exhausted into the exhaust duct during the subsequent exhausting phase and therefore does not participate in additional exhaust-gas recirculation from the intake duct during the intake phase. On account of the fact that the intake valve opening and exhaust valve opening can be set independently in the above way, it is possible to exploit the quantities of exhaust gas present in the cylinder to the extent required to lower the $NO_x$ rates to desired, statutory values. As a result, it is also possible to effect relatively simple retrofitting in order to achieve these values at a later stage. According to the invention, no exhaust gas is sucked back out of the exhaust pipe, since this exhaust gas does not have sufficient potential to lower the $NO_x$ rates and moreover would excessively affect a turbocharger. Irrespective of this, relatively high exhaust-gas recirculation in the lower engine speed range leads to increased smoke numbers on account of the reduced air/fuel ratio which results, whereas according to the invention these increased smoke numbers can be avoided.

The method according to the invention has a beneficial effect in particular in commercial vehicle engines in the full-load range with very high exhaust-gas recirculation rates.

The invention uses fixed cams of the camshaft and one primary or additional cam, with the pressure conditions being such that at low engine speeds after exhaust valve opening, the pressure has already dropped, so that soon after the intake valve is opened by means of the primary cam the direction of flow is reversed, consequently the exhaust gas in the intake duct is pushed back and also flushed out before the main cam opens the intake valve and closes the exhaust valve. By contrast, if the main cam alone is used, as is customary in the prior art, on account of its contour applying equally to all load points, the quantity of recirculated exhaust gas is dependent on load point and therefore also dependent on engine speed, but is fixed, especially since the parameters maximum valve stroke, opening duration and relative positioning define the quantity of exhaust gas transferred into the intake duct.

In addition, during the intake of fresh gas from an intake duct into a cylinder, an exhaust valve can be opened, in order in addition to take in exhaust gas from an exhaust duct, with the exhaust valve also being actuated during intake independently of the periodic exhausting.

Decoupling of the gas exchange from the internal exhaust-gas recirculation allows both operations to be optimally and independently matched to the particular requirements. Limits on the extent to which the exhaust-gas recirculation can be optimized by means of the opening and closing times and the stroke of the respective valve arise only from the pressure conditions present in the cylinder, which under certain circumstances do not allow valves to be opened or closed at any time, and possibly from the design of the internal combustion engine and in particular of the valve gear components.

As a result, the exhaust-gas recirculation rates which can be achieved at full load are higher than in the prior art. Moreover, the fuel consumption is reduced, which can be attributed, inter alia, to reduced gas exchange work on account of lower exhaust gas mass flows.

The intake and/or exhaust valve may be one of the gas exchange valves or an additional valve. The former option allows a more compact form of the internal combustion engine, whereas the latter, on account of mechanical decoupling, ensures adjustment within wider ranges.

The intake and/or exhaust valve for exhaust-gas recirculation can be controlled by way of the camshaft. This merely requires an additional cam on the camshaft. This may be arranged in front of the intake cam or behind the exhaust cam. The successive flanks of the additional cam for the exhaust-gas recirculation and of the cam for the gas exchange should in this case not intersect one another, i.e. the descending flank of the additional cam and the rising flank of the intake cam or the descending flank of the exhaust cam and the rising flank of the additional cam should not intersect one another. If appropriate, an adjustable camshaft can also be used to adapt the control times to the engine state.

Alternatively, the intake and/or exhaust valve for exhaust-gas recirculation can also be electromechanically controlled.

If the intake or exhaust valve is an additional valve, an electrical control device is electrically connected to an electromagnetic, electromechanical, electrohydraulic, electropneumatic, etc. actuator which is known per se and acts on the additional valve directly or, to achieve a flatter overall form and increased actuating force, via a diverter lever or the like. The control decoupled from the camshaft allows control as a function of operating state, so that the valve lift curves can be optimally set at any time. For this purpose, a characteristic diagram which gives the control times and the stroke for the valves as a function of the operating parameters (e.g. load state) of the internal combustion engine can be stored in the electrical control device.

If the intake or exhaust valve is a gas exchange valve, an electromagnetic actuator is provided for adjusting it, this actuator acting on one limb of a diverter lever which is mounted in the cylinder head and the other limb of which is coupled via a free-wheel to the free end of one of the gas exchange valves, allowing camshaft-controlled opening of the gas exchange valve without adjustment of the diverter lever.

The adjustment via a free-wheel decouples the actuator actuation of the gas exchange valve from the camshaft actuation. This allows optimum control, in particular as a function of operating state, of the additional actuation of the gas exchange valve. The exhaust-gas content in the mixture for the internal exhaust-gas recirculation can therefore be set optimally at any time even without an additional valve, in particular taking account of the load state of the internal combustion engine.

Furthermore, further control options are opened up. By way of example, the electromechanical control of the exhaust valve allows an engine braking function to be implemented. In this case, the exhaust valve is briefly opened during compression, in order to allow controlled decompression of the cylinder and to brake the internal combustion engine. The desired braking action can be set by the opening and closing time and the stroke of the exhaust valve independently of the actuation of the gas exchange valves.

The diverter lever can be used to transmit high forces to the gas exchange valve. This is particularly advantageous for the engine braking function, in which an exhaust valve has to be opened during compression counter to the high cylinder internal pressure. Moreover, the diverter lever allows a flat overall form.

The valve-side limb of the diverter lever can actuate the free end of the gas exchange valve directly or indirectly, for example via a valve bridge or a rocker lever. Direct actuation of a gas exchange valve is of simple design and allows the highest possible actuating force, making it particularly suitable for the engine braking function. If, by way of example, the limb engages on a valve bridge via a rocker lever, it is possible for a plurality of gas exchange valves to be actuated simultaneously, albeit with the force divided.

The free-wheel is preferably a bolt which can be displaced in a sleeve as an extension of the axis of the gas exchange valve and which may be arranged on the valve-side limb of the diverter lever. As a result, the diverter lever is in guided engagement with the gas exchange valve or if appropriate the valve bridge or the like. The free-wheel may also be a bearing means on the gas exchange valve side, against which a projection on the valve-side limb of the diverter lever comes to bear.

BRIEF DESCRIPTION OF THE DRAWINGS

Further configurations of the invention are given in the following description and the subclaims.

The invention is explained in more detail below on the basis of exemplary embodiments illustrated in the appended figures. In the drawing.

DESCRIPTION OF THE SPECIFIC EMBODIMENTS

Figure 1:
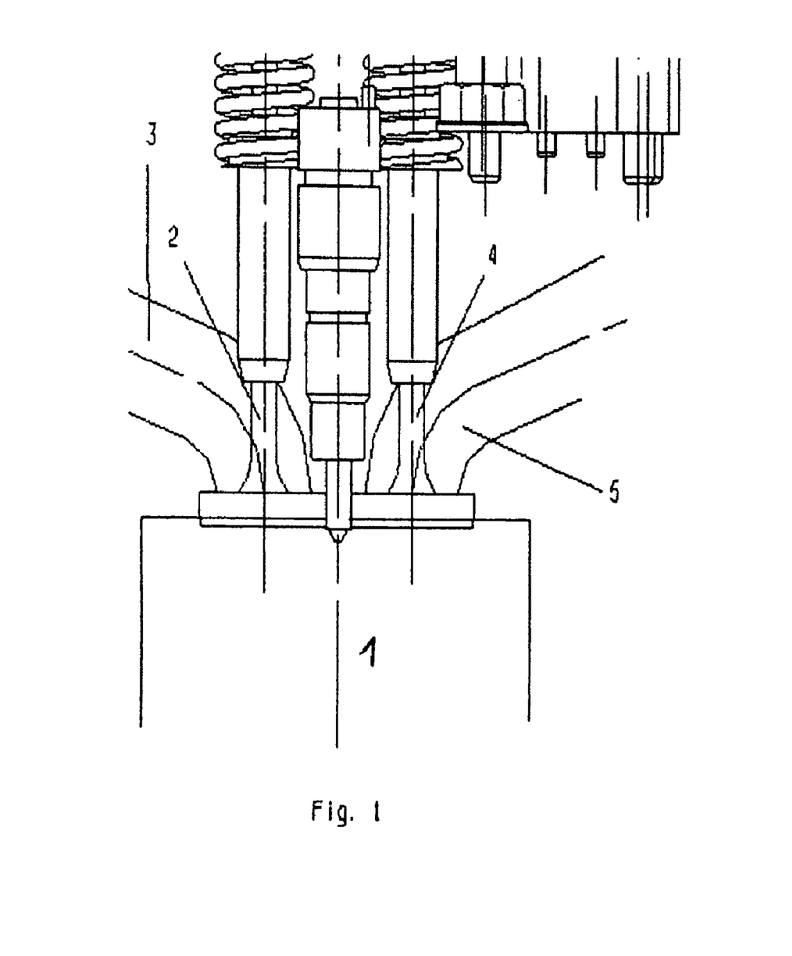
FIG. 1 shows a sectional view through a cylinder of a four-stroke internal combustion engine.

The cylinder 1, which is partially illustrated in FIG. 1, of a plurality of cylinders of a four-stroke internal combustion engine can be connected via an intake valve 2 to an intake duct 3 for fresh gas and via an exhaust valve 4 to an exhaust duct 5 for exhaust gas.

The internal combustion engine successively passes through the strokes of intake, compression, combustion and exhausting, with the strokes of exhausting and intake representing the gas exchange. For this purpose, the valves 2, 4 are actuated periodically in a known way, in particular under camshaft control. During intake, the valve lift curve 6, which is partially illustrated in FIG. 2, results for the intake valve 2, and during exhausting the valve lift curve 7 results for the exhaust valve 4; the two valve lift curves 6, 7 may overlap one another in a known way in order for the exhaust gas to be completely discharged from the cylinder 1.

For internal exhaust-gas recirculation, the intake and/or exhaust valve 2, 4 is/are, moreover, actuated in addition to and independently of the gas exchange.

Figure 2:
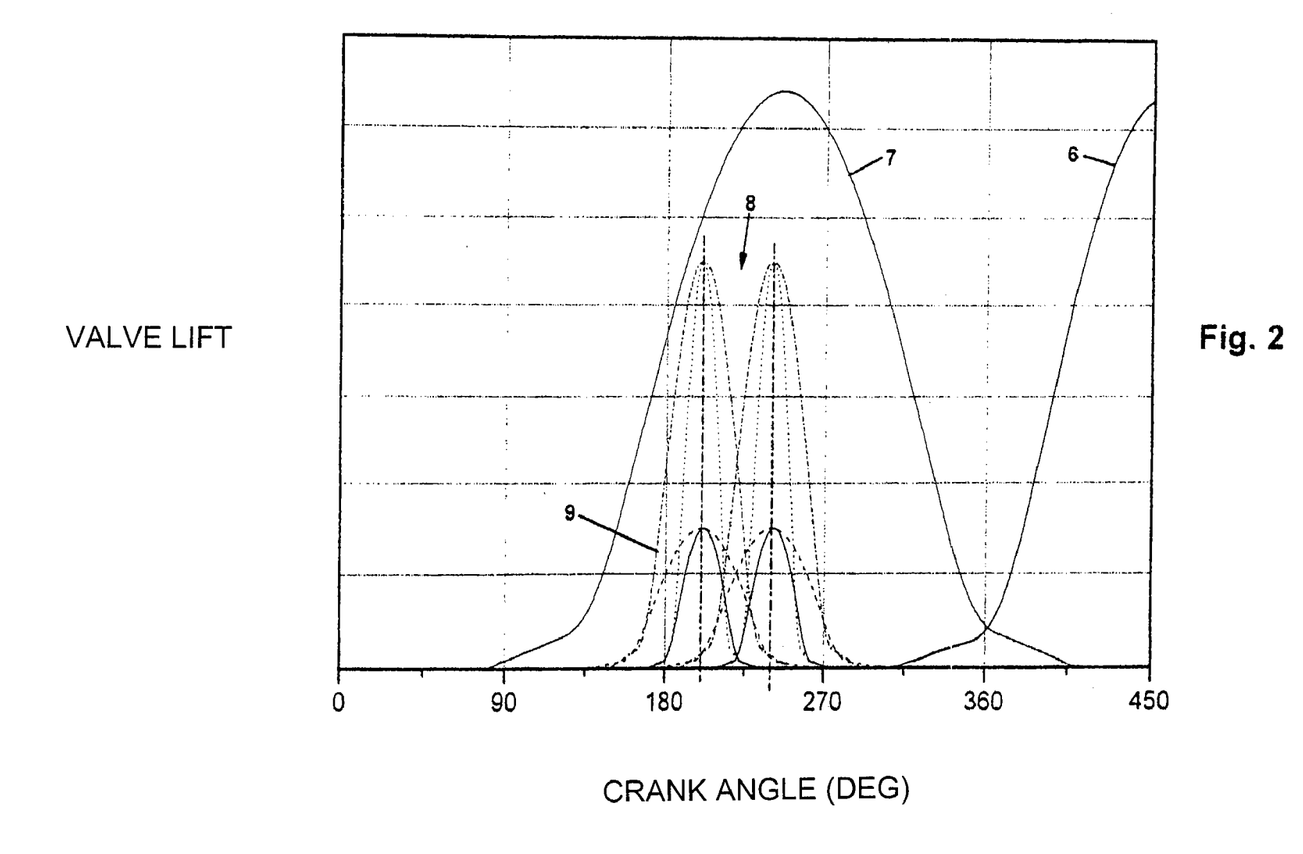
FIGS. 2 and 3 show valve lift curves for the intake and exhaust, the valve stroke being given as a function of the crank angle and the ignition TDC lying at 0° and the gas exchange TDC at 360°.

Additional actuation of the intake valve 2 during exhausting serves to admit part of the exhaust gas formed during combustion to the intake duct 3, in order for a mixture of fresh gas and exhaust gas to be introduced into the cylinder during the next intake stroke. To set the exhaust-gas quantity, it is possible to adjust the opening and closing instants and the valve stroke of the intake valve 2 accordingly, cf. the valve lift curves 8. It is expedient for the intake valve 2 to open with a short stroke just after the exhaust valve 4 and to close well before the latter, cf. the valve lift curve 9. However, it is also possible for the intake valve 2 to open before the exhaust valve 4 or at the same time as it.

Figure 3:
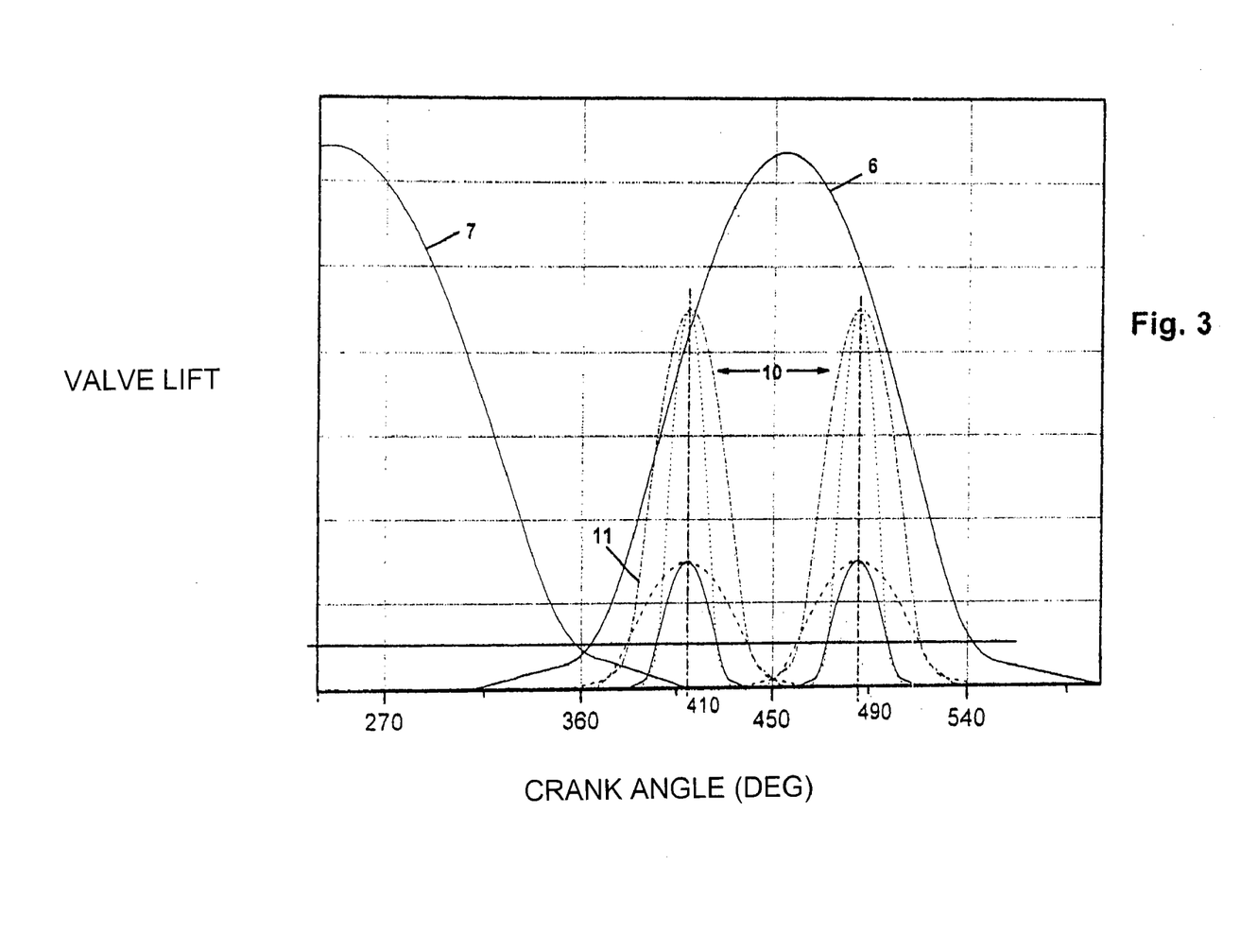

In addition or as an alternative, the exhaust valve 4 can be opened before or during the intake, so that not just fresh gas but also exhaust gas passes into the cylinder 1. In this case too, valve lift curves 10, cf. FIG. 3, may have different opening and closing instants and valve lifts depending on the boundary conditions. It is expedient for the exhaust valve 2 to open with a short stroke just after the intake valve 4 and to close well before the latter, cf. the valve lift curve 11.

As an alternative to the actuation of the intake and exhaust valves 2, 4 used for gas exchange, it is possible to provide one or more additional valves for exhaust-gas recirculation. These additional valves are in each case connected to the intake or exhaust duct 3, 5, expediently via an additional connecting passage.

Figure 4:
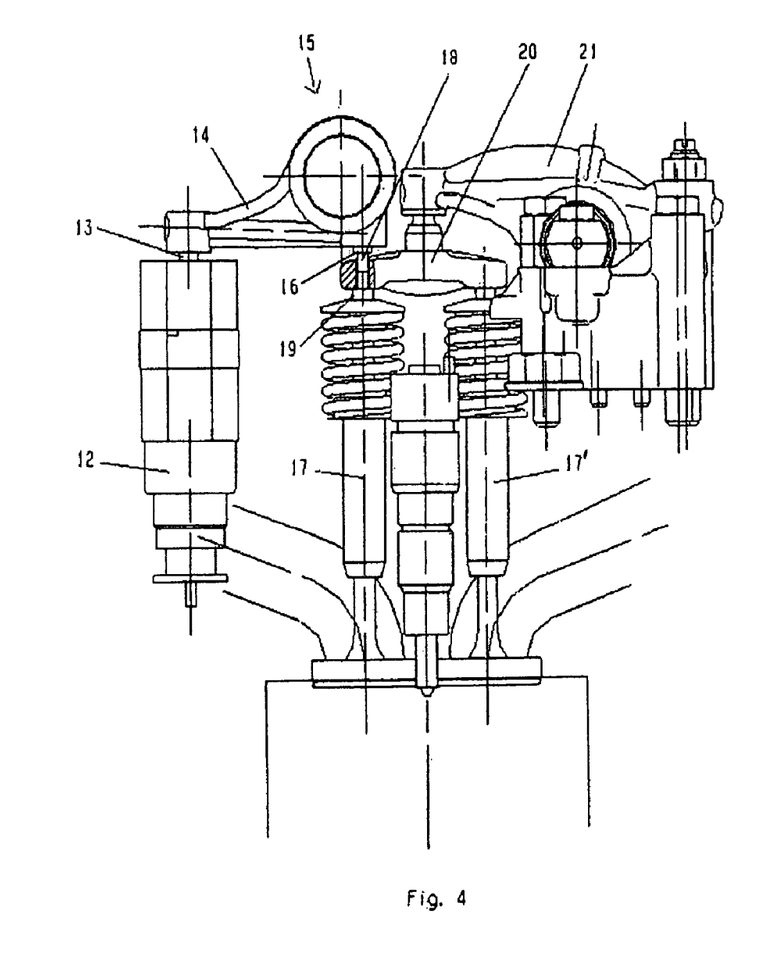
FIG. 4 illustrates a camshaft-independent valve control.

An electromagnetic actuator 12 which is known per se may be arranged in the cylinder head for actuation of the intake and/or exhaust valve 2, 4 whether as a gas exchange valve or as an additional valve, cf. FIG. 4. The actuator 12 engages, via its longitudinally displaceable bolt 13, on a limb 14 of a diverter lever 15 mounted in the cylinder head. The other limb 16 of the diverter lever 15 acts via a free-wheel on a valve 17 that is to be controlled. The free-wheel is in this case formed by a bolt 18 on the limb 16, which is guided in a valve bridge 20, acting directly on a valve stem end 19, in such a manner that it can be displaced in sliding fashion as an extension of the valve axis. As a result, the valve 17 can be actuated both for the known camshaft-controlled gas exchange via a rocker lever 21 and the valve bridge 20 and, independently of this, via the diverter lever 15 for exhaust-gas recirculation or engine braking or the like. The diverter lever 15 can also act on the valve-side end of the rocker lever 21, so that the valves 17, 17' illustrated here can be actuated together.

In this case, an electrical control device can be provided for controlling the opening and/or closing time and/or the valve stroke of the intake and/or exhaust valve 2, 4. As a result, the engine brake and/or the internal exhaust-gas recirculation can be switched on according to demand and controlled as a function of operating state. The valve lift curves 8, 10 can therefore always be optimally matched to the current load state etc. of the internal combustion engine. For this purpose, there is expediently an electronic memory in which is stored a characteristic diagram from which the opening and/or closing time and/or the valve stroke can be called up as a function of the operating state of the internal combustion engine in order to achieve the desired exhaust-gas recirculation rate or the desired engine braking effect.

The actuator 12 may have a permanent magnet which acts in the direction of deflecting the bolt 13, assisting an electrically actuated closing magnet in the actuator 12, so as to reduce the power required for deflection.

As an alternative to using the actuator 12, it is also possible for the actuation of the intake and/or exhaust valve 2, 4 for exhaust-gas recirculation to be camshaft-controlled. For this purpose, a camshaft 22 has both a cam 23 for the gas exchange and an additional cam 24 for the exhaust-gas recirculation, cf. FIG. 5, which cams may, as illustrated, be spaced apart from one another along the longitudinal axis of the camshaft 22, cf. FIG. 6. In the case of internal combustion engines with two camshafts, the cam 23 may be arranged on one camshaft and the additional cam 24 on the other camshaft.

Figures 5, 6:
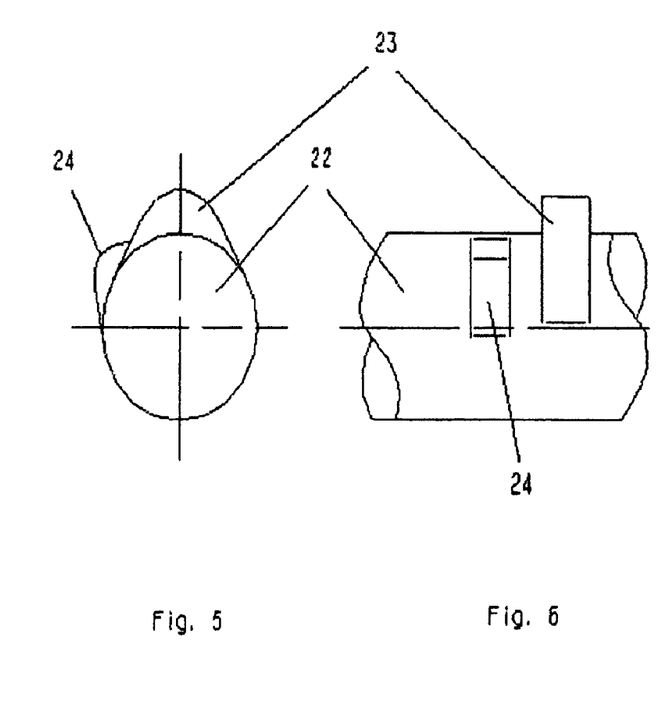
FIG. 5 shows a camshaft cross section.
FIG. 6 shows a camshaft portion.

If the cams 23, 24, contrary to what is illustrated in FIG. 5, are arranged at one location on a camshaft, a separate valve adjustment is required for each cam 23, 24, allowing independent actuation of the associated valve. This can take place analogously to the adjustment illustrated in FIG. 4. In particular, the cams 23, 24 may each be assigned a rocker lever, in which case both rocker levers act independently on a valve stem end or a valve bridge.

Figure 7:
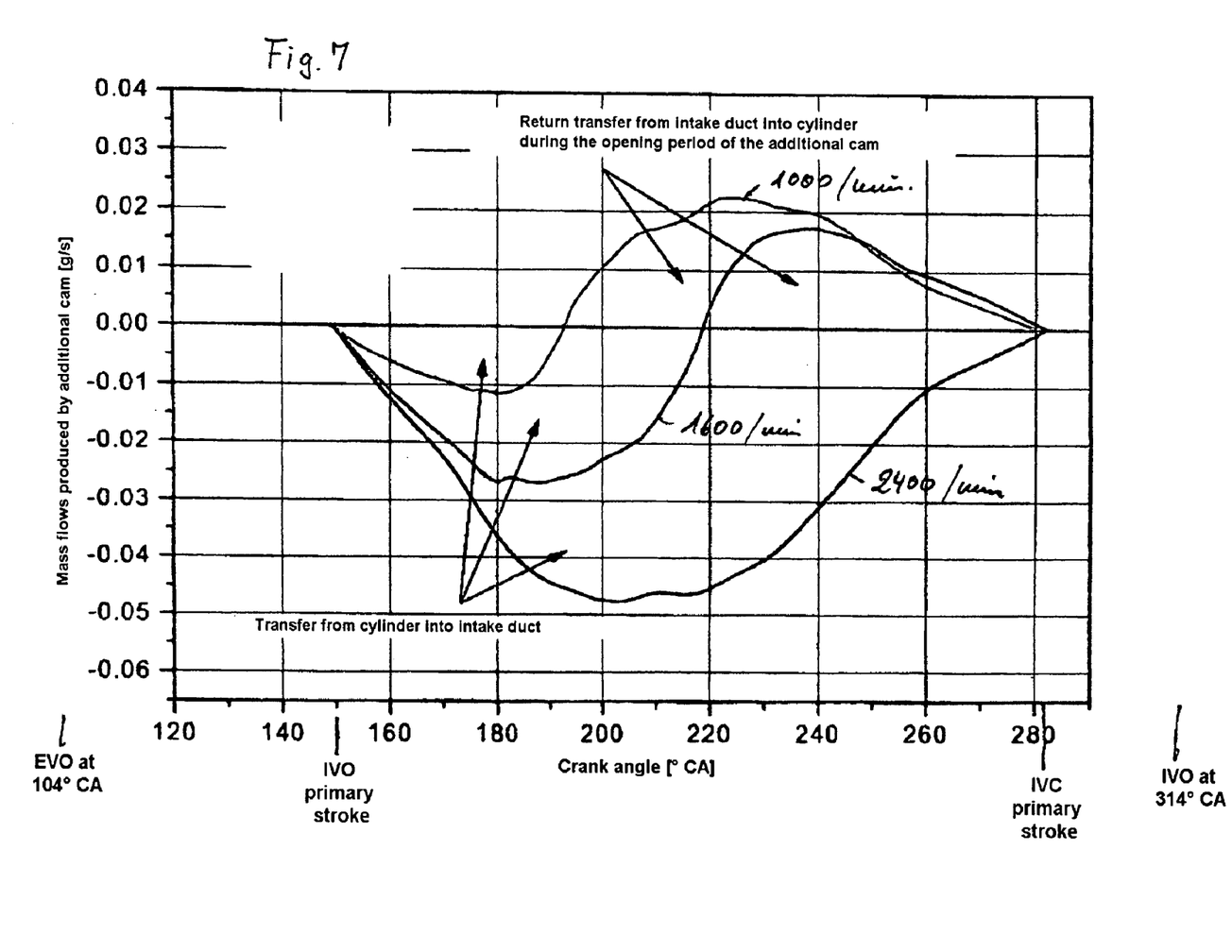
FIG. 7 shows a diagram in which the transfer of exhaust gas in accordance with the invention into the intake duct and from the latter into the cylinder is plotted, by way of example, as mass flow against the crank angle for various engine speeds.

The diagram illustrated in FIG. 7 plots, by way of example, curves for different engine speeds at full load in the situation in which additional opening of the respective intake valve 2 (IVO) is being started by the additional cam 24 at 150° crank angle (° CA) after top dead center of the ignition, while the opening of the exhaust valve 4 (EVO) takes place at 104° CA, the curves plotting the transfer of exhaust gas into the intake duct or out of it into the cylinder 1 as mass flow [g/s] against crank angle [° CA]. The curve parts below the zero axis represent the transfer of exhaust gas out of the respective cylinder 1 into the intake duct 3, while the curve parts above the zero axis represent the transfer of exhaust gas back out of the intake duct 3 into the cylinder 1 during the opening period of the intake valve 3 caused by the additional cam 24.

Figure 8:
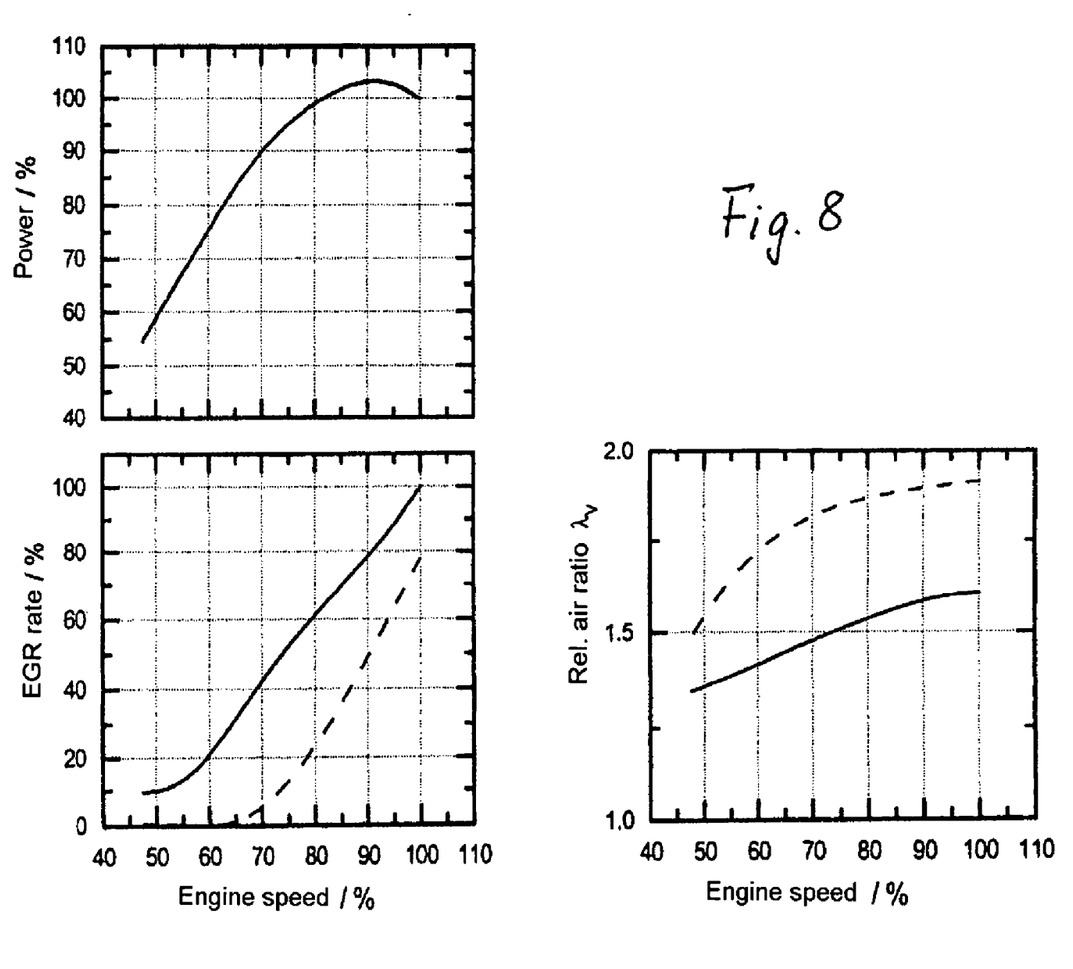
FIG. 8 shows power, exhaust-gas recirculation rate and relative air ratio plotted against engine speed in diagrammatic form.

With regard to the internal exhaust-gas recirculation by additional opening of the intake valve 3 by means of the additional cam 24, FIG. 8 shows a diagram plotting a calculated comparison between power in %, exhaust-gas recirculation rate (EGR rate in %) and relative air ratio $\lambda_v$, plotted against the engine speed in %, between opening of the intake valve 3 at approximately 180° CA after top dead center of the ignition (cf. WO 03/040540), dashed curves, and opening at 120° CA after top dead center of the ignition (in accordance with the invention), solid curves, under otherwise identical conditions (EVO at 85° CA). The latter is shown in the diagram in which the power is plotted against the engine speed, since in that diagram both curves coincide. The two other diagrams show that opening at approximately 180° CA leads to significantly lower exhaust-gas recirculation quantities, specifically at approximately 70% of rated engine speed there is virtually no exhaust-gas recirculation any more, even though this is required at this point and is also delivered according to the invention, so that smoke-free combustion ensues over the entire engine speed range. Although opening at approximately 180° CA leads to high relative air ratios, these are not required.

The invention claimed is:

1. A method for internal exhaust-gas recirculation in an internal combustion engine with gas exchange valves periodically controlled by a camshaft in accordance with the four-stroke principle, in which method, during the gas exchange exhausting of exhaust gas from the respective cylinder into the exhaust duct by opening the exhaust valve, an intake valve associated with the respective cylinder is additionally opened in a crank angle range after top dead center of the ignition of the gas mixture present in the cylinder, in order to exhaust part of the exhaust gas into an intake duct, so that during the next gas exchange intake both fresh gas and exhaust gas are taken in from the intake duct, the respective intake valve being actuated during the gas exchange exhausting in addition to the periodic gas exchange intake, characterized in that the start of additional opening of the respective intake valve is carried out in the range from 110 to 150% of the opening angle of the start of opening of the exhaust duct by the exhaust valve.

2. The method as claimed in claim 1, characterized in that the start of additional opening of the respective intake valve is carried out in the range from 110 to 130% of the opening angle of the start of opening of the exhaust duct by the exhaust valve.

3. The method as claimed in claim 1, characterized in that the intake valve and/or the exhaust valve is/are electromechanically actuated.

4. The method as claimed in claim 3, characterized in that the opening and/or closing time and/or the valve stroke of the intake and/or exhaust valve is/are controlled according to the operating state of the internal combustion engine.

5. The method as claimed in claim 3, characterized in that the opening and/or closing time and/or the valve stroke is/are called up from an electronic memory.

6. An internal combustion engine with gas exchange valves periodically actuated by a camshaft in accordance with the four-stroke principle for connecting a cylinder to an intake duct during gas exchange intake and to an exhaust duct during gas exchange exhausting, in which there are an exhaust valve and an intake valve, which is additionally opened during the gas exchange exhausting of exhaust gas from the cylinder into the exhaust duct, in order for part of the exhaust gas to be exhausted into the intake duct, so that during the next gas exchange intake both fresh gas and exhaust gas are taken in from the intake duct into the cylinder, the start of additional opening of the respective intake valve being provided in the range from 110 to 150% of the opening angle of the start of opening of the exhaust duct by the exhaust valve.

7. The internal combustion engine as claimed in claim 6, characterized in that there is a control device for actuating the exhaust valve during the gas exchange intake independently of the periodic gas exchange exhausting and/or for actuating the intake valve during the gas exchange exhausting independently of the periodic gas exchange intake.

8. The internal combustion engine as claimed in claim 6, characterized in that an electromagnetic actuator is connected to an electronic control device and acts on a limb of a diverter lever, which is mounted in the cylinder head and the other limb of which is coupled, via a free-wheel, to the free end of one of the gas exchange valves, allowing camshaft-controlled opening of the gas exchange valve without adjustment of the diverter lever.

9. The internal combustion engine as claimed in claim 7, characterized in that the control device is provided for opening and closing the intake and/or exhaust valve during the gas exchange exhausting or gas exchange intake from a closed position.

10. The internal combustion engine as claimed in one of claims 6 or 7, characterized in that the intake valve and/or the exhaust valve is/are gas exchange valves.

11. The internal combustion engine as claimed in one of claims 6 or 7, characterized in that the intake valve and/or the exhaust valve are additional valves which can be closed during the gas exchange intake and/or the gas exchange exhausting involved in the gas exchange.

12. The internal combustion engine as claimed in claim 7, characterized in that the control device comprises an additional cam on the camshaft.

13. The internal combustion engine as claimed in claim 7, characterized in that the intake and/or exhaust valve is an electromechanically actuable valve and the control device is a circuit.

14. The internal combustion engine as claimed in claim 13, characterized in that the control device is designed to control the opening and/or closing time and/or the valve stroke of the intake and/or exhaust valve according to the operating state of the internal combustion engine.

15. The internal combustion engine as claimed in claim 14, characterized in that an electronic memory is provided, in which the opening and/or closing time and/or the valve stroke is/are stored as a function of the operating state of the internal combustion engine.

16. The internal combustion engine as claimed in claim 8, characterized in that the free-wheel is a bolt which can be displaced as an extension of the axis of the gas exchange valve.

17. The internal combustion engine as claimed in claim 15, characterized in that the bolt is arranged on the valve-side limb of the diverter lever.

18. The internal combustion engine as claimed in claim 8, characterized in that the valve-side limb of the diverter lever is in engagement with the free end of the gas exchange valve.

19. The internal combustion engine as claimed in claim 8, characterized in that the valve-side limb of the diverter lever is in engagement with a valve bridge or a rocker lever for the gas exchange valve.

20. The use of the internal combustion engine as claimed in claim 6 for engine braking.

* * * * *